United States Patent
Parkinson et al.

(10) Patent No.: US 8,308,226 B2
(45) Date of Patent: Nov. 13, 2012

(54) STORAGE PANEL ASSEMBLY FOR A VEHICLE

(75) Inventors: Matthew Frank Parkinson, Ann Arbor, MI (US); Robert Charles Steinbrecher, Dexter, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 373 days.

(21) Appl. No.: 12/628,375

(22) Filed: Dec. 1, 2009

(65) Prior Publication Data
US 2011/0127799 A1    Jun. 2, 2011

(51) Int. Cl.
*B60N 2/56* (2006.01)
(52) U.S. Cl. .... 296/208; 296/191; 296/37.2; 296/37.13; 454/152
(58) Field of Classification Search ............. 296/190.09, 296/191, 208, 37.1, 37.2, 37.13, 37.14, 1.07, 296/1.06; 454/152, 195
See application file for complete search history.

(56) References Cited

U.S. PATENT DOCUMENTS

| 2,649,191 | A | * | 8/1953 | McLaughlin | 206/373 |
| 4,750,774 | A | * | 6/1988 | Pickering | 296/37.13 |
| 4,752,096 | A | | 6/1988 | Ishikawa | |
| 5,098,126 | A | | 3/1992 | Kanke et al. | |
| 5,310,103 | A | | 5/1994 | Weber et al. | |
| 5,915,777 | A | | 6/1999 | Gignac et al. | |
| D435,284 | S | | 12/2000 | Sutula | |
| 6,230,949 | B1 | | 5/2001 | O'Connell et al. | |
| 6,336,671 | B1 | | 1/2002 | Leonardi | |
| 6,626,423 | B2 | | 9/2003 | Doswell | |
| D516,402 | S | | 3/2006 | Gates et al. | |
| 7,036,697 | B2 | | 5/2006 | Hwang et al. | |
| 7,303,221 | B2 | * | 12/2007 | Takahashi et al. | 296/37.1 |
| 7,562,924 | B2 | * | 7/2009 | Schultz et al. | 296/37.14 |
| 2009/0174204 | A1 | * | 7/2009 | Robertson | 296/1.08 |

* cited by examiner

*Primary Examiner* — Jason S Morrow
(74) *Attorney, Agent, or Firm* — Gifford, Krass, Sprinkle, Anderson & Citkowski, P.C.

(57) ABSTRACT

A storage panel assembly for a vehicle includes a panel having a louvered exterior and internal surfaces. A vent structure is formed on a portion of the panel. At least one jack wrench clip assembly is formed on the portion of the panel including the vent structure. The exterior louvered surface of the panel remains unblemished.

19 Claims, 5 Drawing Sheets

STORAGE PANEL ASSEMBLY FOR A VEHICLE

FIELD OF THE INVENTION

The invention relates to storage panel assemblies for vehicles.

BACKGROUND OF THE INVENTION

Vehicles may include various storage areas for different components including tire components such as a jack, wrench, or lug. Typically, such accessories are stored in various different locations within a vehicle. For example, a spare tire and jack may be stored in one area while the wrench and lug may be stored in a separate area. There is therefore a need in the art for a storage area which would house all of the tire carrier accessories in a location that is easily accessible such that a user does not need to search for various components.

Additionally, prior art storage areas may have the various components stored in plastic bags or other types of containers that add to an overall cost of the vehicle. Further, typical prior art storage areas are solid panels that do not allow for the flow of air through the panel. There is therefore a need in the art for a storage panel assembly that may store various components such as tire accessories and allow the ingress and egress of air from an HVAC system.

SUMMARY OF THE INVENTION

In one aspect, there is disclosed a storage panel assembly for a vehicle that includes a panel having a louvered exterior and internal surfaces. A vent structure is formed on a portion of the panel. At least one jack wrench clip assembly is formed on the portion of the panel including the vent structure. The exterior louvered surface of the panel remains unblemished.

In another aspect, there is disclosed a storage panel assembly for a vehicle that includes a panel having a louvered exterior and internal surfaces. A vent structure is formed on a portion of the panel. At least one jack wrench clip assembly formed on the portion of the panel including a vent structure is provided. The jack wrench clip assembly includes first and second clip members formed on the internal louvered surface and a third clip member formed on an edge of the internal louvered surface.

In a further aspect, there is disclosed a storage panel assembly for a vehicle that includes a panel having louvered exterior and internal surfaces. A vent structure is formed on a portion of the panel. At least one jack wrench clip assembly is formed on the portion of the panel including the vent structure. A lug nut retention assembly is formed on the internal louvered surface. A tire strap retention structure is formed on the internal louvered surface. The storage panel assembly stores tire carrier accessories and functions as an HVAC vent.

DETAILED DESCRIPTION OF THE PREFERRED EMBODIMENTS

Figure 1:
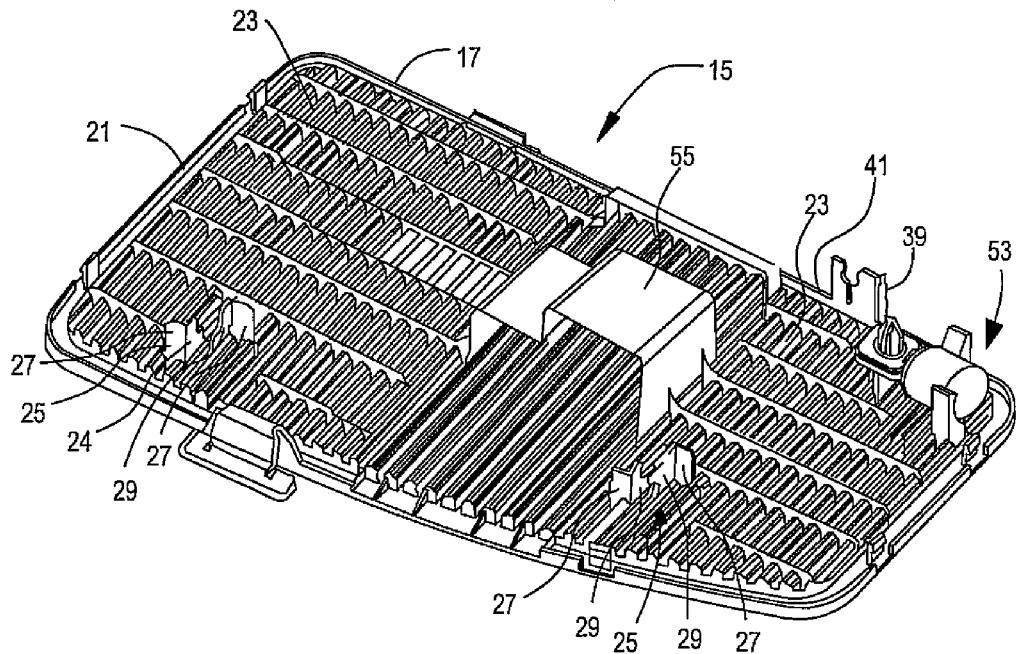
FIG. 1 is a perspective view of a storage panel assembly.
Figure 10:
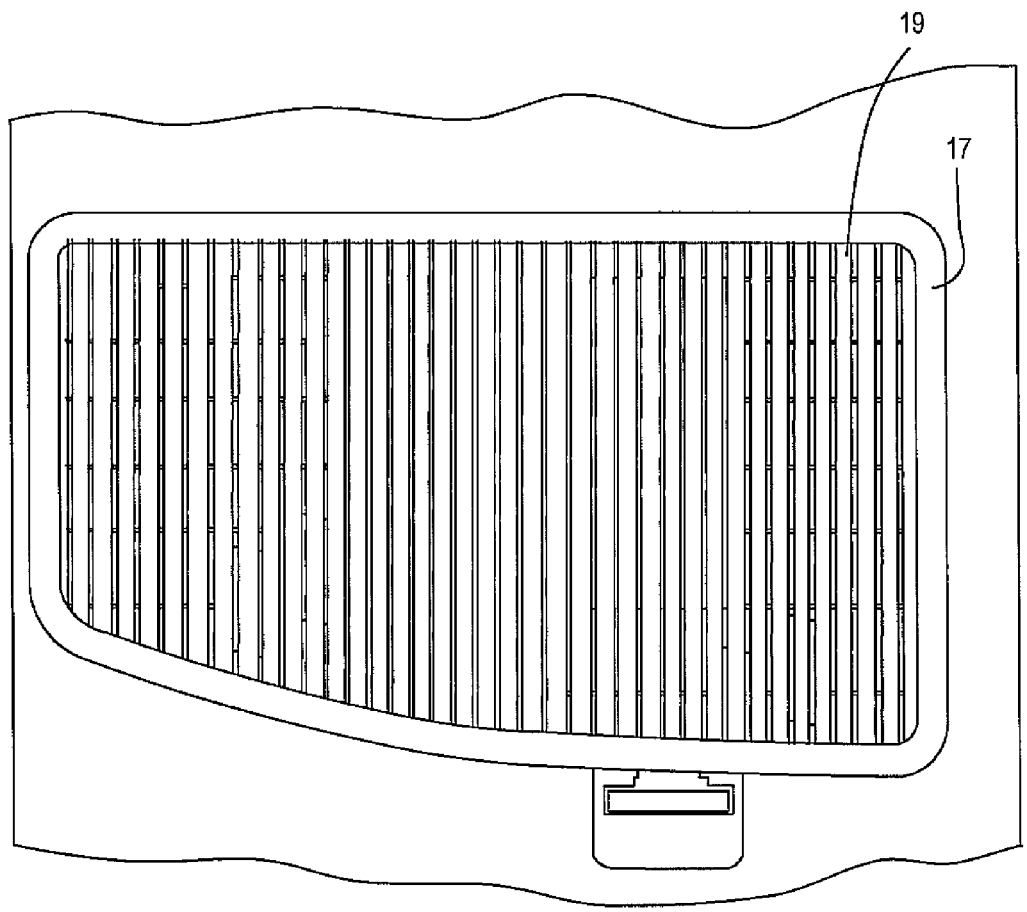
FIG. 10 is a perspective view of the exterior surface of the panel.

Referring to FIGS. 1 and 10, there is shown a storage panel assembly 15 for a vehicle. The storage panel assembly 15 may include a panel 17 having louvered exterior and internal surfaces 19, 21. A vent structure 23 may be formed on a portion of the panel 17. At least one jack wrench clip assembly 25 is formed on the portion of the panel 17 that includes the vent structure 23. The exterior louvered surface 19 of the panel 17 remains unblemished. In this manner, the storage panel assembly 15 may include a vent structure 23 allowing air transport through the vent and also includes a jack wrench clip assembly 25 such that the panel when viewed from the exterior remains unblemished and appears as a vent structure.

Figure 7:
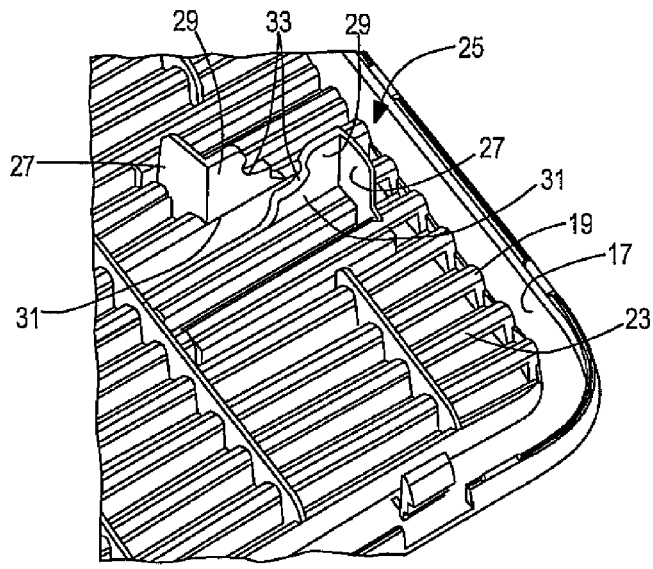
FIG. 7 is a partial perspective view of a jack wrench clip formed on the storage panel.
Figure 8:
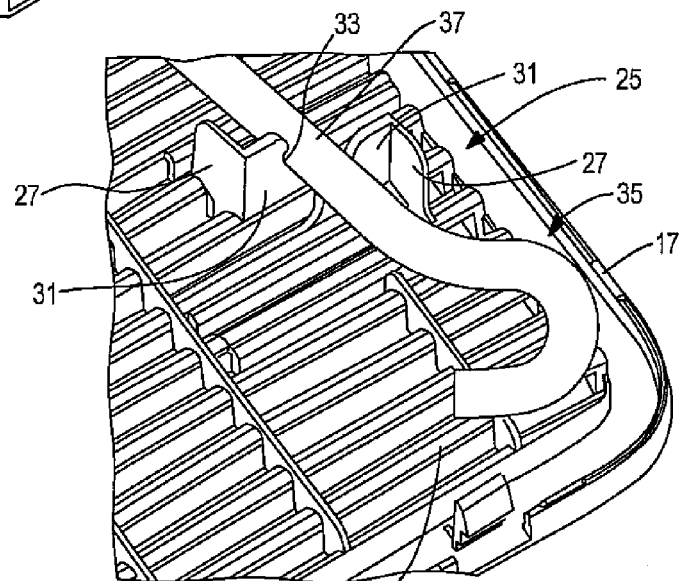
FIG. 8 is a partial perspective view of the jack wrench clips including the jack wrench.

Referring to FIGS. 7 and 8, there is depicted one embodiment of a jack wrench clip assembly 25. In one aspect, the at least one jack wrench clip assembly 25 may include first and second clip members 27 formed on the internal louvered surface 21. The first and second clip members 27 may be positioned in an offset and opposing relationship. The first and second clip members 27 may include at least one wall 29 that has a base 31 attached to the internal louvered surface 21 of the panel 17. The at least one wall 29 extends away from the base 31 and includes a slot 33 formed therein. In one aspect, the slots 33 of the first and second clip members 27 are opposing and offset relative to each other. In the depicted embodiment, the first and second clip members 23 may include two walls joined at an angle with one of the walls including the slot 33 formed therein. Again, as referenced above, the slots 33 of the first and second clip members 27 may be opposed and offset relative to each other.

Figure 2:
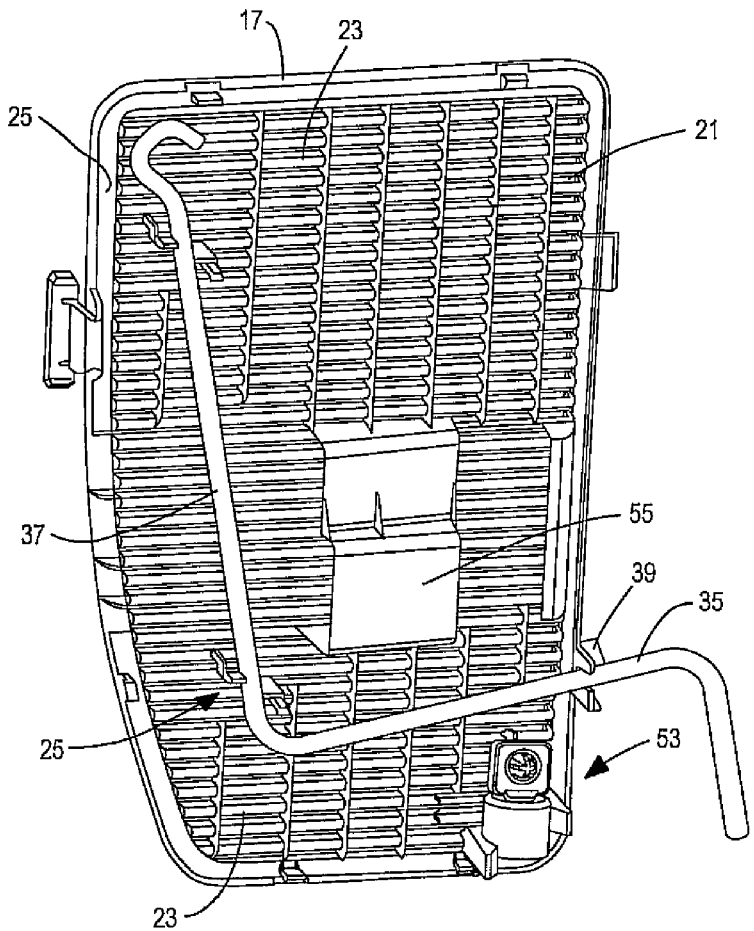
FIG. 2 is a perspective view of a storage panel assembly including a tire wrench and lug nut attached to the storage panel.
Figure 3:
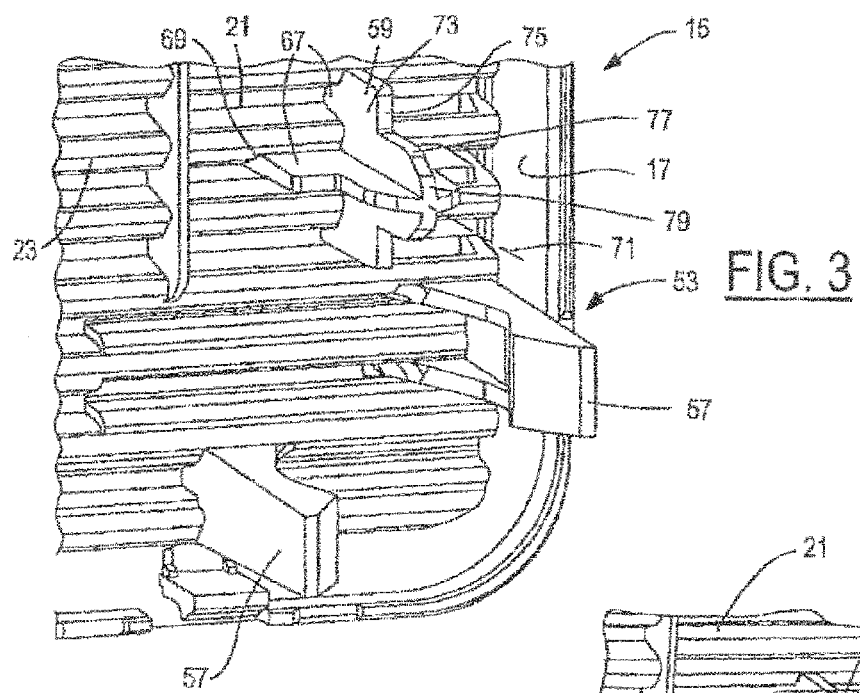
FIG. 3 is a partial perspective view of a lug nut retention assembly formed on the panel.
Figure 4:
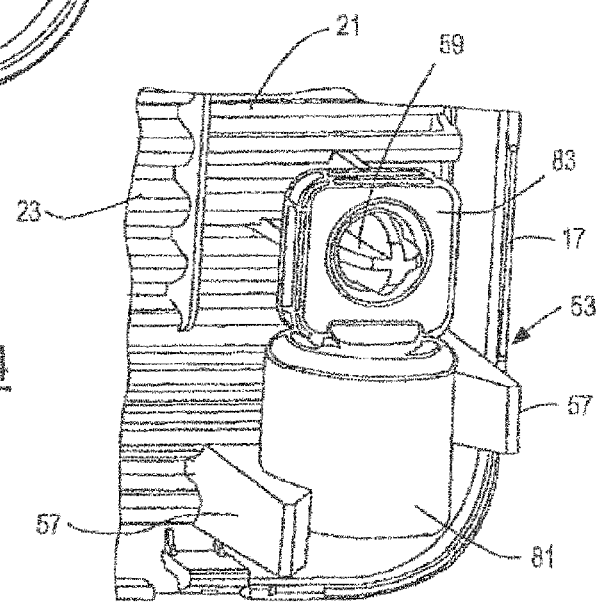
FIG. 4 is a partial perspective view of a lug nut retention assembly including the lug nut.

Again referring to FIG. 1, the storage panel assembly 15 may include two jack clip assemblies 25 formed on the portion of the panel 17 that includes the vent structure 23. The two jack clip assemblies 25 are shaped and sized such that they receive a wrench 35 having a body 37 that is retained in the jack wrench clip assembly 25. In the depicted embodiments of FIGS. 2 and 8, the jack wrench 35 may include a cylindrical body 37 that is positioned between the opposing first and second jack wrench clips 27. The cylindrical body 37 is received in the opposing slots 33, and the first and second clips 27 exert a force on the body 37 of the jack wrench 35 securely retaining it in the opposing jack wrench clips 27.

Figure 9:
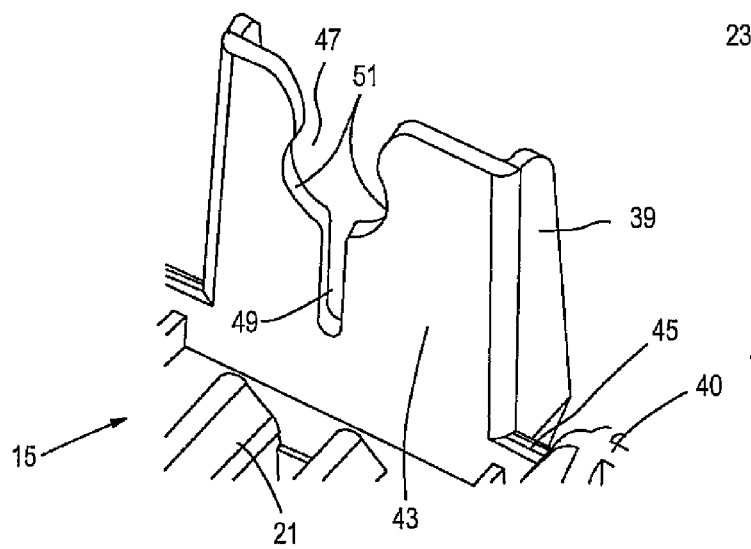
FIG. 9 is a partial perspective view of a jack wrench clip formed on an edge of the storage panel assembly.
Figure 11:
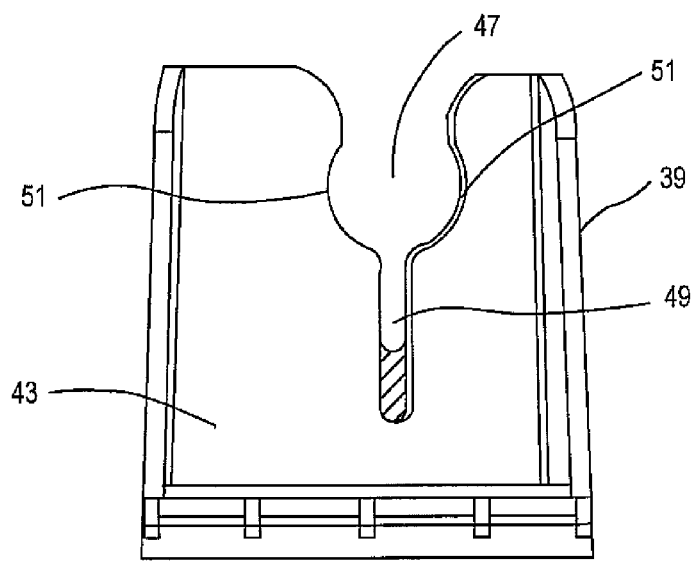
FIG. 11 is a partial perspective view of the third clip having a differing depth notch.
Figure 12:
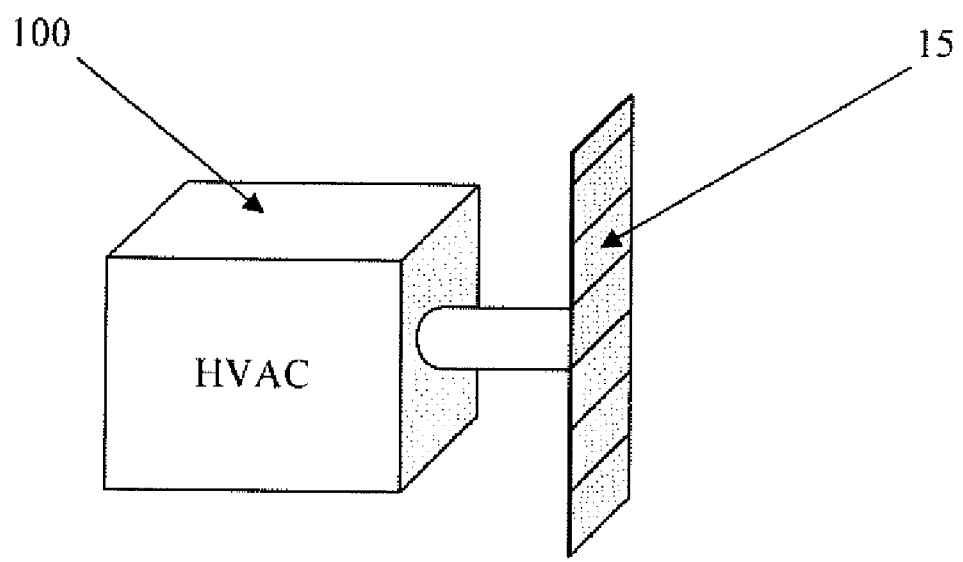
FIG. 12 is a schematic view of the panel and the HVAC system.

Referring to FIGS. 1 and 9, the storage panel assembly 15 may include a third clip member 39 formed on an edge 41 of the internal louvered surface 21. The third clip member 39 may include at least one wall 43 having a base 45 attached to the edge 41 of the panel. The at least one wall 43 extends away from the base 45. In one aspect, the at least one wall 43 includes a slot 47 formed therein. The slot 47 includes a notch 49, best shown in FIGS. 9 and 11, that extends toward the internal surface 21 of the panel 17. In one aspect, the length of the notch 49 may be adjusted to define a variable pivot of opposing sides 51 of the slot 47. As best shown in FIG. 11, the notch 49 may be adjusted such that an insertion force of the jack wrench 35 into the slot 47 of the third clip member 39 may be adjusted. For example, the notch 49 shown in FIG. 9 has a larger depth or length, meaning the insertion force required to position the jack wrench 35 into the third clip member 39 would be less than that shown in FIG. 11. The notch 49 of FIG. 11 has a shorter length or depth of the notch 49, and the force required to separate the opposing sides 51 of the slot 47 would be greater in FIG. 11 than that of FIG. 9. In one aspect, the depth of the notch 49 may be adjusted such that various retention forces can be designed for various jack wrenches or tailoring the specific insertion force required.

Again referring to FIGS. 1 and 2, the storage panel assembly 15 for a vehicle may include various additional connection structures. As described above, the panel 17 includes louvered exterior and internal surfaces 19, 21. A vent structure 23 is formed on a portion of the panel 17. At least one jack wrench clip assembly 25 is formed on a portion of the panel 17 including the vent structure 23. A lug nut retention assembly 53 may be formed on the internal louvered surface 21. A tire strap retention structure 55 may also be formed on the internal louvered surface 21. The storage panel assembly 15 stores the various tire accessories and functions as an HVAC vent.

Referring to FIGS. 1-6, the storage panel assembly 15 may include a panel 17 having louvered exterior and internal surfaces 19, 21, a vent structure 23 formed on a portion of the panel 17, and at least one lug nut retention assembly 53 formed on the portion of the panel including the vent structure 23 wherein the exterior louvered surface 19 of the panel 17 remains unblemished. In one aspect, the lug nut retention assembly 53 may include a pair of opposing offset clips 57 formed on the internal surface 21 of the panel 17. Additionally, the lug nut retention assembly 53 may include a holding pin 59 formed on the internal surface 21 of the panel 17. In one aspect, the opposing clips 57 may include at least one wall 61 having a base 63 attached to the internal louvered surface 21 of the panel 17. The at least one wall 31 extends away from the base 63. In one aspect, the at least one wall 61 may include an arcuate surface 65 formed on one side of the wall 61. The arcuate surfaces 65 of the first and second clips 57 may be opposing and offset relative to each other.

The holding pin 59 preferably includes a plurality of walls 67 having a base 69 attached to the internal louvered surface 21. The walls 67 extend away from the base 69. In one aspect, the plurality of walls 67 includes four connected walls that are connected about a central axis 71. The walls 67 may be spaced radially about the axis 71 with the depicted embodiment showing a radially spaced 90 degrees between the walls 67.

In one aspect, each of the plurality of walls 67 includes a support portion 73 that extends from the base 69. The support portion 73 extends radially outward about the central axis 71 and includes a planar support surface 75. Additionally, each of the plurality of walls 67 may include a retention portion 77 that extends longitudinally relative to the support portion 73. In one aspect, the retention portion 77 terminates at a radiused end 79.

Figure 5:
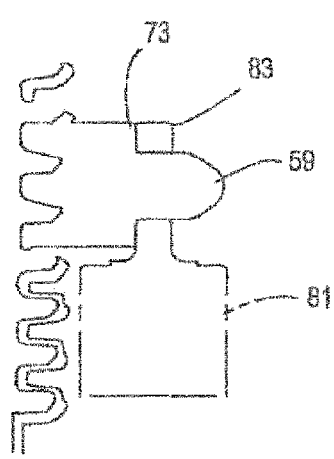
FIG. 5 is a partial sectional view of the lug nut and lug nut retention assembly.
Figure 6:
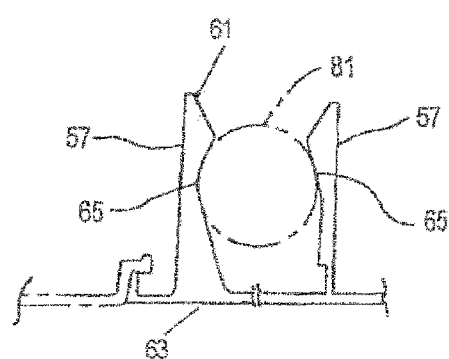
FIG. 6 is a partial sectional view of the lug nut and lug nut retention assembly.

In use, a lug nut 81 may be positioned between the offset opposing clips 57. The lug nut 81 may include a retention tab 83 attached to the lug nut 81. The retention tab 83 includes a hole 85 formed therein that may be positioned about the holding pin 59. The retention tab 83 may then be received on the support portion 73. As shown in FIGS. 5 and 6, the lug nut 81 may be retained between the arcuate surfaces 65 of the offset clips 57 while the retention tab 83 is positioned about the pin 59 and supported on the support portion 73 of the pin 59.

As stated above, the lug nut retention assembly 53 includes a pair of offsetting clips 57 formed on the internal surface 21 of the panel 17 and a holding pin 59 formed on the internal surface 21 of the panel 17. The exterior surface 19 of the panel 17 remains unblemished while it also functions as an HVAC vent for the HVAC system 100 allowing passage of air.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A storage panel assembly for a vehicle having an HVAC system, the panel comprising:
   a removable panel having louvered exterior and internal surfaces;
   a vent structure formed on a portion of the panel, the vent structure fluidly connected to an HVAC system;
   at least one jack wrench clip assembly formed on the portion of the panel including the vent structure wherein the exterior louvered surface of the panel remains unblemished.

2. The storage panel assembly of claim 1 wherein the at least one jack wrench clip assembly includes first and second clip members formed on the internal louvered surface.

3. The storage panel assembly of claim 2 wherein the first and second clip members are positioned in an offset and opposing relationship.

4. The storage panel assembly of claim 2 wherein the first and second clip members include at least one wall having a base attached to the louvered internal surface of the panel, the at least one wall extending away from the base.

5. The storage panel assembly of claim 2 wherein the at least one wall includes a slot formed therein.

6. The storage panel assembly of claim 5 wherein the slots of the first and second clip members are opposing and offset relative to each other.

7. The storage panel assembly of claim 2 wherein the first and second clip members include two walls joined at an angle, one of the walls including a slot formed therein wherein the slots of the first and second clip members are opposing and offset relative to each other.

8. The storage panel assembly of claim 2 including two sets of first and second clips formed on the portion of the panel including the vent structure.

9. The storage panel assembly of claim 1 including a wrench having a body that is received in the at least one jack wrench clip assembly.

10. The storage panel assembly of claim 1 wherein the at least one jack wrench clip assembly includes a third clip member formed on an edge of the internal louvered surface.

11. The storage panel assembly of claim 10 wherein the third clip member includes at least one wall having a base attached to the edge of the panel, the at least one wall extending away from the base.

12. The storage panel assembly of claim 11 wherein the at least one wall includes a slot formed therein.

13. The storage panel assembly of claim 12 wherein the slot includes a notch extending toward the internal surface of the panel.

14. The storage panel assembly of claim 13 wherein the length of the notch is adjusted to define a variable pivot of opposing sides of the slot.

15. The storage panel assembly of claim 14 wherein an insertion force of a jack wrench into the slot of the third clip member may be adjusted.

16. The storage panel assembly of claim 1 wherein the at least one jack wrench clip assembly includes a plurality of clip members including first and second clip members formed on the internal louvered surface and a third clip member formed on an edge of the internal louvered surface.

17. The storage panel assembly of claim 1 including a lug nut retention assembly formed on the internal louvered surface including the portion including the vent structure.

18. The storage panel assembly of claim 1 including a tire strap retention structure formed on the internal louvered surface.

19. A storage panel assembly for a vehicle having an HVAC system, the panel comprising:
- a removable panel having louvered exterior and internal surfaces;
- a vent structure formed on a portion of the panel, the vent structure fluidly connected to an HVAC system;
- at least one jack wrench clip assembly formed on the portion of the panel including the vent structure;
- a lug nut retention assembly formed on the internal louvered surface;
- a tire strap retention structure formed on the internal louvered surface;
- wherein the storage panel assembly stores tire accessories and functions as an HVAC vent.

* * * * *